United States Patent
Hanson et al.

(10) Patent No.: US 10,621,249 B2
(45) Date of Patent: Apr. 14, 2020

(54) SYSTEMS AND METHODS FOR USE IN SECURING DATA OF A MULTI-TENANT DATA STRUCTURE

(71) Applicant: MASTERCARD INTERNATIONAL INCORPORATED, Purchase, NY (US)

(72) Inventors: Tristan C. Hanson, Ballwin, MO (US); Matthew Stephen Wahl, Cottleville, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 387 days.

(21) Appl. No.: 15/279,865

(22) Filed: Sep. 29, 2016

(65) Prior Publication Data
US 2018/0089320 A1 Mar. 29, 2018

(51) Int. Cl.
*G06F 16/00* (2019.01)
*G06F 16/9535* (2019.01)
*H04L 29/08* (2006.01)
*H04L 29/06* (2006.01)
*G06F 21/62* (2013.01)

(52) U.S. Cl.
CPC ...... *G06F 16/9535* (2019.01); *G06F 21/6227* (2013.01); *H04L 63/08* (2013.01); *H04L 63/10* (2013.01); *H04L 67/02* (2013.01)

(58) Field of Classification Search
CPC .......... G06F 21/6227; G06F 17/30165; G06F 17/30607; G06F 2221/0753; G06F 17/30306; G06F 17/30427; G06F 17/30861
See application file for complete search history.

(56) References Cited

U.S. PATENT DOCUMENTS

| | | |
|---|---|---|
| 2007/0038596 A1 | 2/2007 | Pizzo et al. |
| 2007/0118534 A1 | 5/2007 | Hayes et al. |
| 2008/0082540 A1 | 4/2008 | Weissman et al. |
| 2013/0018869 A1* | 1/2013 | Hanson ............. G06F 16/958 707/722 |
| 2015/0186666 A1 | 7/2015 | Jacquin |
| 2017/0222997 A1* | 8/2017 | Kroehling ........... H04L 63/101 |
| 2017/0371928 A1* | 12/2017 | Chainani ........... G06F 16/24549 |

* cited by examiner

*Primary Examiner* — Truong V Vo
(74) *Attorney, Agent, or Firm* — Harness, Dickey & Pierce, P.L.C.

(57) ABSTRACT

Disclosed are exemplary embodiments of systems and methods for securing data of a multi-tenant data structure. One exemplary method generally includes receiving a data request directed to a data structure, identifying a user associated with the data request, and activating, by a computing device, a data query filter based on the user identified when the data request triggers a security pointcut. The method also includes executing, by a computing device, a data query on the data structure based on the data request where the data query is constrained by a data query filter, and causing a data query result to be delivered in response to the data request.

17 Claims, 3 Drawing Sheets

SYSTEMS AND METHODS FOR USE IN SECURING DATA OF A MULTI-TENANT DATA STRUCTURE

FIELD

The present disclosure generally relates to systems and methods for use in enabling filters, based on identifiers of a user, prior to querying multi-tenant data structures, and in particular, to limiting queries to multi-tenant data structures, based on the user and/or tenant initiating the queries, such that only results associated with the user and/or tenant are returned in response to the queries.

BACKGROUND

This section provides background information related to the present disclosure which is not necessarily prior art.

A variety of different networks are known to manage data. Specifically, for example, payment networks are known to maintain data (e.g., transaction data) associated with transactions coordinated by and/or through the payment networks. Additional data unrelated to transactions may further be stored in and maintained by the payment networks. The transaction data, which is often related to a variety of entities (e.g., issuers, acquirers, etc.), is often stored in data structures with transaction data associated with different entities included in the same data structures, often referred to as multi-tenant data structures. The payment networks permit certain entities to retrieve transaction data, and potentially other data, from the data structures. The entities, in turn, are able to request from the payment networks (whereby the entities are referred to as requestors) and receive, in return, the transaction data from the data structures. The payment networks are known to gather the transaction data, in response to the entities request, and then filter and/or reduce the transaction data based on authorizations associated with the entities prior to returning it to the requestors.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks, for example, often maintain multi-tenant data structures for storing transaction data and other data associated with the operations of the payment networks. The data structures are multi-tenant, in part, because the data structures include data from at least two or more tenants. The data structures often allow tenants of the data structures, such as, for example, acquirers, issuers, etc. (broadly, entities associated with data contained in the data structures, etc.), or other entities (based on agreements, etc.), to retrieve data from the multi-tenant data structures, through one or more queries. The queries are often implemented, such that each unique query includes its own security filtering, resulting in the security logic for the queries being copied for every new query. Then, in response to the queries, the payment networks retrieve the requested data and, on the back end, limit the data according to the query's copied security coding. The limitations imposed, by the security code, often affect the form (e.g., pagination, etc.), format, and/or quality of the data returned, which may require further revision before being provided to the requestor.

Uniquely, the systems and methods herein employ identity-based filtering to queries of the data structures, thereby limiting access to data included therein. In particular, a search engine is provided to receive queries to the multi-tenant data structures and to enable identity-based filters for each (or at least some) of the queries prior to permitting the queries to hit the multi-tenant data structures. In this manner, the search engine permits the query to request, in the data layer, for example, and to return data in a manner consistent with the request in the expected form, format and quality, but potentially without the need to further process the data and/or to alter the data for form, format and/or quality. The search engine, therefore, may provide enhanced security for the multi-tenant data structure, while further potentially providing improved efficiencies in data retrievals, reducing size of data retrieved in response to queries, and/or reducing the number of copies of security code (e.g., access request code, etc.), etc.

Figure 1:
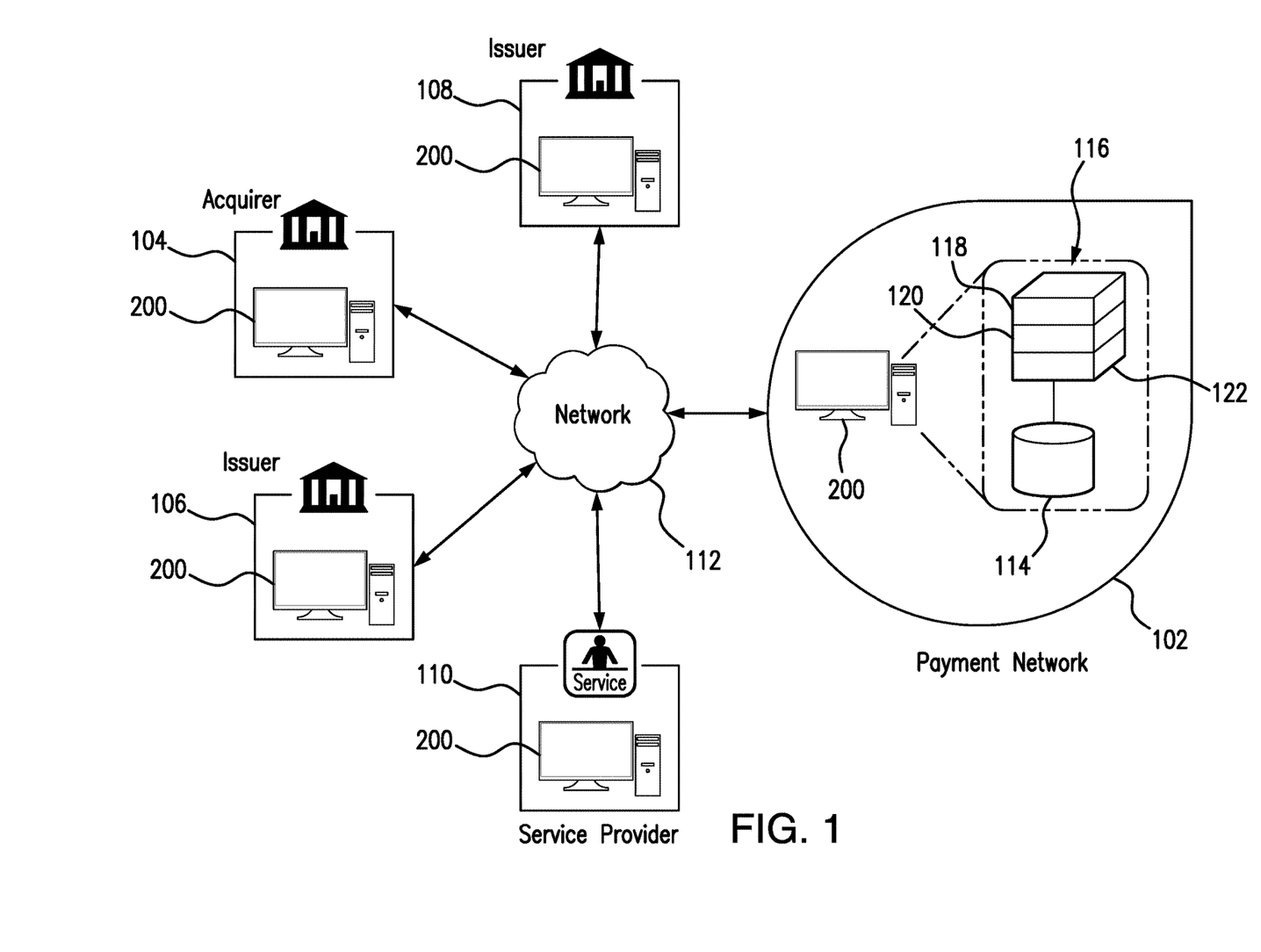
FIG. 1 is a block diagram of an exemplary system of the present disclosure suitable for use in enabling tenant-specific filters in connection with data access to a multi-tenant data structure.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on availability of transaction data to entities, manners in which data is stored in the data structure and retrieved therefrom, etc. More generally, the system 100 is presented as a payment network system for purposes of illustration. It should be appreciated, however, that other systems and included data structures related or unrelated to payment networks are within the scope of the present disclosure.

Referring to FIG. 1, the system 100 generally includes a payment network 102, an acquirer 104, issuers 106 and 108, and a service provider 110. Each of acquirer 104, issuers 106 and 108, and service provider 110 are coupled at least to payment network 102 via a network 112. The network 112 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 112 includes multiple networks, where different ones of the multiple networks are accessible to different ones of the illustrated parts in FIG. 1. In this example, acquirer 104 and issuers 106 and 108 may access the payment network 102 via a private payment transaction network made accessible by the payment network 102 and, separately, the service provider 110 may access the payment network 102 via a public network (e.g., via a website or via web-based applications, etc.).

In the system 100, the payment network 102 facilitates and/or participates in transactions between the acquirer 104, the issuers 106 and 108 and the service provider 110 (as applicable), and potentially multiple other similar or different entities. Transactions associated with the payment network 102 typically represent payment account transactions and/or fund transfers between different accounts associated with two parties.

For instance, in an exemplary transaction, a consumer (not shown) desires to purchase one or more goods and/or services from a merchant (not shown) (associated with the acquirer 104). The consumer initiates a transaction with the merchant, which, in turn, compiles and transmits an authorization request to the acquirer 104 to determine whether the account is in good standing and whether there are sufficient funds and/or credit to cover the transaction. Upon receipt, the acquirer 104 communicates the authorization request to the issuer 106, through the payment network 102, such as, for example, through MasterCard®, VISA®, Discover®, American Express®, etc. In turn, if approved, an authorization reply (indicating the approval of the transaction) is transmitted back from the issuer 106 to the acquirer 104, again via the payment network 102, thereby permitting the transaction to proceed. The transaction is later cleared and/or settled by and between the merchant and the acquirer 104 (via an agreement between the merchant and the acquirer 104) and by and between the acquirer 104 and the issuer 106 (via an agreement between the acquirer 104 and the issuer 106 (and the payment network 102)), via further communications. However, if the issuer 106 declines the transaction, a reply declining the transaction is conventionally provided back to the merchant.

It should be appreciated that the service provider 110 may be involved in the transaction, on behalf of the payment network 102, the acquirer 104 and/or the issuers 106 and 108 at various stages of the transaction, whether for authorization or clearing or settlement, depending on the type of service provided thereby.

Transaction data is generated, collected, and stored as part of the above conventional interactions among the payment network 102, the acquirer 104, the issuers 106 and 108, and the service provider 110. The transaction data represents at least a plurality of purchase transactions, for example, authorized transactions, cleared transactions, attempted transactions, etc. The transaction data, in this exemplary embodiment, is stored at least by the payment network 102 (e.g., in a data structure (described below) associated therewith, etc.). With that said, transaction data may include, for example, primary account numbers (PANs), amounts of the transactions, merchant IDs, merchant category codes (MCCs), dates/times of the transactions, products purchased and related descriptions or identifiers, etc. It should be appreciated that more or less information related to transactions, as part of either authorization, clearing, and/or settling, may be included in transaction data and stored within the system 100, at the merchant, the acquirer 104, the payment network 102, and/or the issuer 108.

Further, in connection with a payment account transaction (as indicated above) and/or other interaction and/or services provided in association with the payment network 102 (e.g., unrelated to payment account transactions, etc.), the service provider 110 may generate, provide, and/or store data, including transaction data or other data, and provide the data to the payment network 102 to be stored in one or more data structures therein. Such services may include, for example, authentication services, loyalty services, marketing/advertising services, fraud services, analytic services, performance services, etc. Generally, the service provider 110 may include any entity that interacts with the payment network 102 to provide any service thereto or in association therewith. The service provider 110 may include any number of different entities, which interact with the payment network 102, and more specifically, data possessed by the payment network 102, or other entities in system 100.

It should further be appreciated that, apart from payment account transactions and/or transfers, the payment network 102 may further provide a variety of services to consumers, merchants, acquirers (e.g., the acquirer 104), issuers (e.g., issuers 106 and 108, etc.), service providers (e.g., service provider 110) (broadly, entities), which rely on the collection, management, access, and dissemination of data from one or more data structures at the payment network 102. For example, the payment network 102 may offer advertising services, fraud services, authentication services (e.g., via service provider 110), reward services, virtual wallet services, coupon services, and/or any other services that may be associated with and/or reliant on transaction data (or other data managed by the payment network 102), etc.

It should be appreciated that a different number of entities may be included in other system embodiments, and that the present disclosure is not specific to one payment network 102, one acquirer 104, two issuers 106 and 108, and one service provider 110. The number of entities included in the exemplary system 100 is for purposes of illustration, and not intended to limit the scope of the present disclosure. Likewise, the description herein is directed to payment networks, generally, but it should again be appreciated that the description herein is applicable beyond payment network and/or payment account transactions, to other forms of multi-tenant data structures and retrieval of data therefrom.

Figure 2:
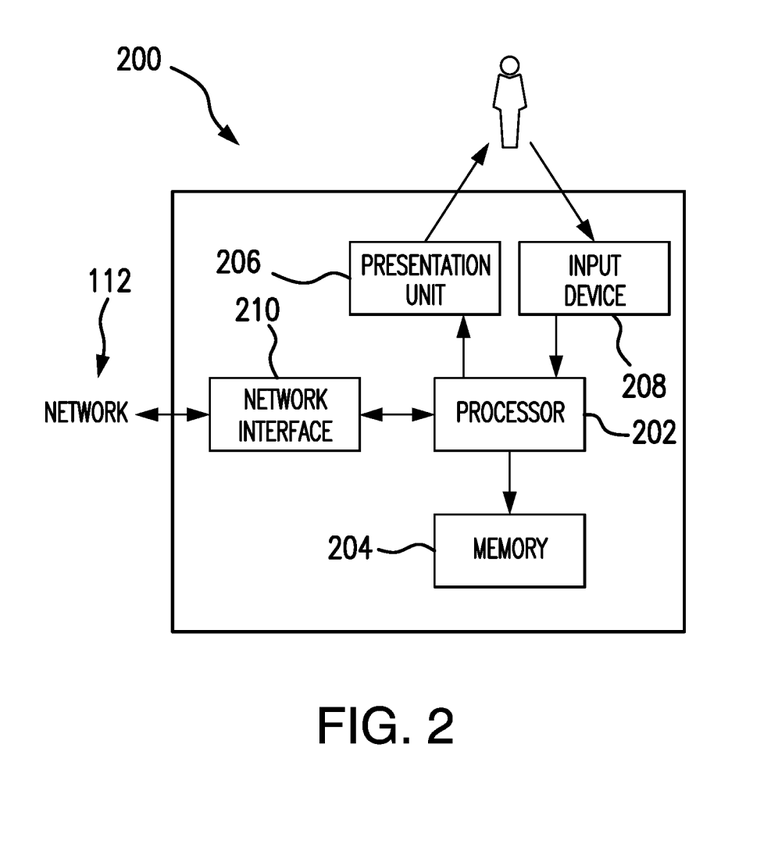
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices. In the exemplary embodiment of FIG. 1, each of the payment network 102, acquirer 104, issuers 106 and 108, and service provider 110 are illustrated as including, or being implemented in, a computing device 200. Again, however, the system 100, and parts thereof, should not be understood to be limited to the particular arrangement of the computing device 200, as other arrangements and/or types of computing devices may be employed in other system embodiments.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, tenant identifiers, data access relational data, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more operations herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information, either visually or audibly to a user of the computing device 200, such as, for example, a user associated with one or more computing devices included herein, etc. It should be further appreciated that various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an LED, an organic LED (OLED) display, an "electronic ink" display, speakers, etc. In some embodiments, presentation unit 206 includes multiple devices.

The computing device 200 also includes an input device 208 that receives inputs from the user (i.e., user inputs). The input device 208 is coupled to (and is in communication with) the processor 202 and may include, for example, a keyboard, a pointing device, a mouse, a button, a stylus, a touch sensitive panel (e.g., a touch pad or a touch screen, etc.), a camera or other optical input device, another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 112. Further, in some exemplary embodiments, the computing device 200 includes the processor 202 and one or more network interfaces 210 incorporated into or with the processor 202.

Referring again to FIG. 1, as shown, the payment network 102 includes a data structure 114, which includes a variety of data that may be used by and/or associated with payment account transactions and/or services, etc. The data may further be unrelated to payment account transactions and/or payment network services, but may be relevant to the payment network 102 and/or one or more entities associated with the payment network 102 (e.g., the acquirer 104, the issuers 106 and 108, and/or the service provider 110, etc.). The data structure 114 is a multi-tenant data structure, in that it includes data associated with multiple different entities or "tenants" of the data structure. In this exemplary embodiment, the multi-tenant data structure 114 includes transaction data (and/or other data) identified to the acquirer 104, the issuers 106 and 108, and the service provider 110, etc. It should be appreciated that additional data, associated with other entities, may be included in the data structure 114.

The data structure 114 is generally present in memory, such as, for example, memory 204 included in one or more computing devices, located together in a geographic location, or spread across a geographic region (i.e., remote from one or more others, etc.).

The payment network 102 further includes a search engine 116, which is coupled to the data structure 114 and configured by executable instructions to provide access to the data structure 114, as described herein. In this exemplary embodiment, the search engine 116 is configured according to a layered architecture including three logical layers: a transport layer 118, a business layer 120, and a data layer 122. It should be understood that the search engine 116 may be configured otherwise, with the same or a different number of logical layers, for example, dedicated to a variety of tasks, in other payment network embodiments or other embodiments in general without departing from the scope of the disclosure herein.

In this exemplary embodiment, the transport layer 118 is configured to provide and/or expose access interfaces enabling tenants to access the payment network 102, and specifically, the data contained in the data structure 114. The transport layer interfaces may be configured to enable a tenant (e.g., issuer 108, etc.) to provide data for storage by the payment network 102 and to request access to data stored by the payment network 102. Specifically, the transport layer 118 may be configured to provide access, via the Internet or other network, such as, for instance, by HyperText Transfer Protocol (HTTP), HyperText Transfer Protocol Secure (HTTPS), File Transfer Protocol (FTP), Simple Object Access Protocol (SOAP), Simple Mail Transfer Protocol (SMTP), etc. Further, the transport layer 118, as part of any request for data received there through, is configured to authenticate the requestor, which provided the search engine 116 with the identity of the user and/or tenant (broadly, requestor) (for use as described below). The authentication may be provided through an authorization service, such as, for example, Java Authentication and Authorization Service (JAAS) or other similar service, etc., potentially depending on a type of interface offered by the transport layer 118, etc.

The business layer 120 is configured to execute business logic and processing of received requests for data from the multi-tenant data structure 114 and of outgoing responses including data from the multi-tenant data structure 114, and to store data in the multi-tenant data structure 114, and the like. The business layer 120 may be configured to execute workflows, in response to receiving requests to store data, in the multi-tenant data structure 114, via the transport layer 118, and/or to apply business logic to raw data results received from the data layer 122. The business layer 120 may be configured to activate and/or impose one or more filters specific to issuer 108 (or other entity) for an object-relational mapping (ORM) object (e.g., a Hibernate ORM object, other Java Persistence API (JPA) object, etc.), for example, such that interactions with the data layer 122 and data structure 114 via the ORM object only yield data results associated with the issuer 108.

In one example, the search engine 116 is configured, in part, as the business layer 120, by the executable instructions provided in the code segment below. In this example, a data security aspect called "RowLevelSecurityAspect" is configured with a pointcut to intercept requests for data from the multi-tenant data structure 114, based on certain condition(s), as shown below. If the condition(s) are satisfied (e.g., the function call is within the "Service" scope, Row Level Security has not been disabled, etc.), the "enableRowLevelSecurityFilters" operation is called.

```
@Aspect
public class RowLevelSecurityAspect {
    private final static Logger LOGGER =
LoggerFactory.getLogger(RowLevelSecurityAspect.class);
    private RowLevelSecurityHandler handler;
    @Autowired
    public RowLevelSecurityAspect(RowLevelSecurityHandler
    rowLevelSecurityAspect)
    {
        this.handler = rowLevelSecurityAspect;
    }
    @Before("@within(org.springframework.stereotype.Service) " +
        "&& !(@annotation(com.example.RowLevelSecurityDisabled))" +
        "|| @within(com.example.RowLevelSecurityDisabled))")
    public void enableRowLevelSecurityFilters(JoinPoint joinPoint) {
        LOGGER.debug("Enabling Row-Level Security for { }.{ }",
            joinPoint.getSignature( ).getDeclaringTypeName( ),
            joinPoint.getSignature( ).getName( ));
        handler.enableRowLevelSecurityFilters( );
    }
}
```

In addition to the above, the search engine 116 is further configured, in part, as the business layer 120, by the executable instructions provided in the code segment below. In this example, the code segment "SpringSecurityRLSHandler" includes an "enableRowLevelSecurityFilters" operation, as called in the code segment above. The operation configures the search engine 116, to obtain a user data object from a user security utility ("UserSecurityUtil") and to enable a filter using a user ID of the user data object as a parameter, thereby making the data request user specific.

```
@Component
public class SpringSecurityRLSHandler implements
RowLevelSecurityHandler {
    public static final String USERID = "USERID";
    @Autowired EntityManager entityManager;
    @Override
    public void enableRowLevelSecurityFilters( ) {
        SecurityUser user = UserSecurityUtil.getUser( );
        ((Session)
entityManager.getDelegate( )).enableFilter(USERID).
setParameter("USER_ID", user.getUserId( ));
    }
}
```

The data layer 122 is configured to provide a mechanism for interaction with the multi-tenant data structure 114 (e.g., queries, etc.) and further to define one or more filters for the data requested therefrom. In one example, the business layer 120 may be configured to maintain an object-relational mapping (ORM) object for interacting with the data layer 122 and the data structure 114 and, upon receiving data requested from issuer 108, via the transport layer 118, for example, the business layer 120 may be configured to activate a filter associated with issuer 108 (based on an ID associated with the issuer 108) on the ORM object and to cause the ORM object to interact with the data layer 122. The data layer 122 may then be used to query the multi-tenant data structure 114 based, at least in part, on the activated filter of the ORM object. The data returned by the query from the multi-tenant data structure 114 is then limited to data that satisfies the activated filter of the ORM object, i.e., it is limited by the ID associated with the issuer 108 (e.g., by relation mapping between the USER_ID parameter to the :USER_ID=user_id clause in the filter definition above, etc.). In some embodiments, the data layer 122 may be configured using an associated language, such as Structured Query Language (SQL), or the like.

In this exemplary embodiment, the search engine 116 is further configured, in part, as the data layer 122, by the executable instructions provided in the code segment below. For instance, the code segment below includes a filter definition that filters data based on the user ID.

```
@FilterDefs({
    @FilterDef(name = SpringSecurityRLSHandler.USERID,
        parameters = @ParamDef(name = "USER_ID", type = "string"))
})
@Filters({
    @Filter(name = SpringSecurityRLSHandler.USERID, condition =
":USER_ID = user_id")
})
@Entity
public class Foo {
    @Id
    private String userId;
    private String data;
}
```

It should be appreciated that the code segments provided above are merely exemplary and are provided for purposes of illustration, and therefore various other executable instructions may be provided to cause the search engine 116 to be configured as described. As such, the present disclosure should not be understood to be limited to the exemplary code segments.

Figure 3:
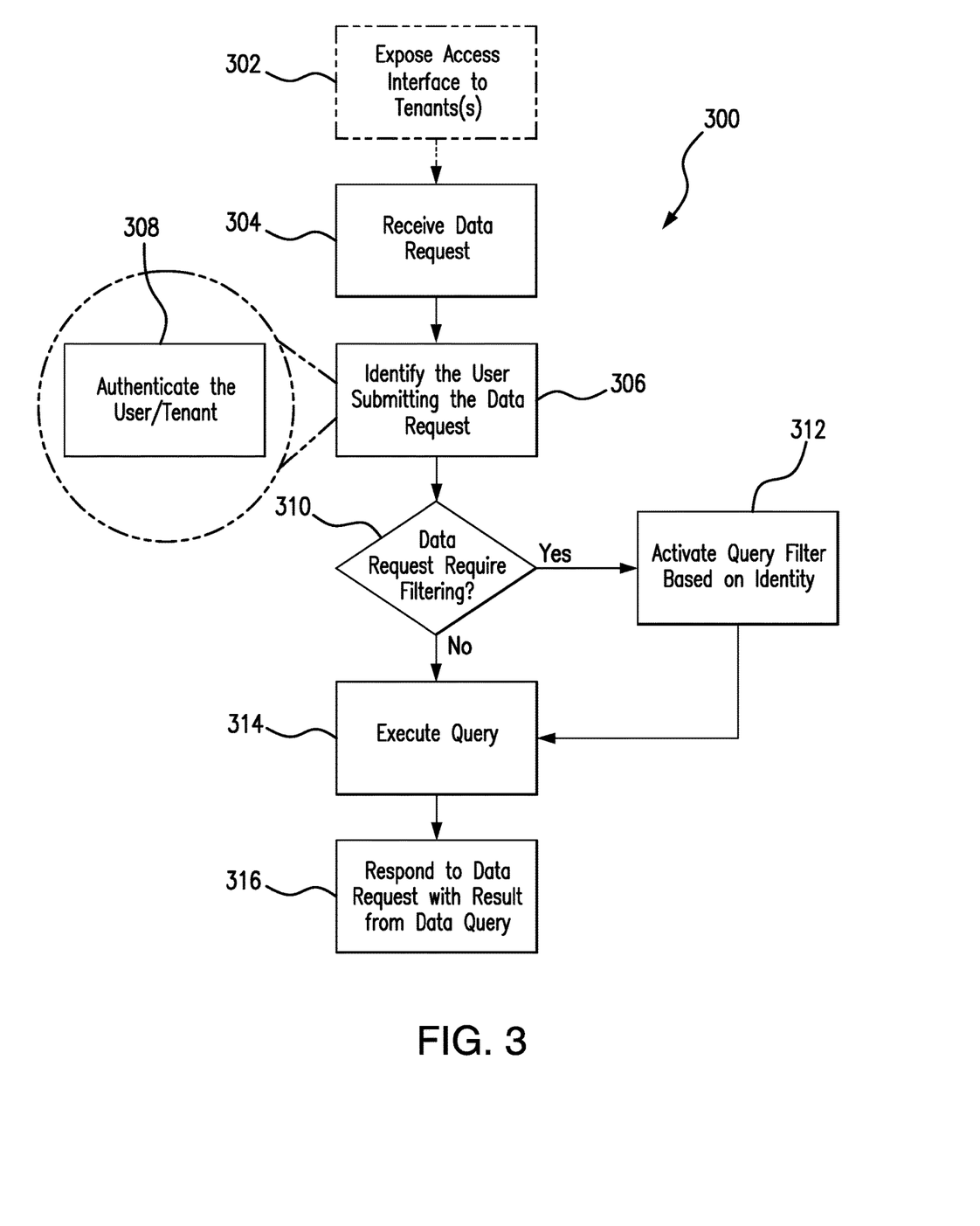
FIG. 3 is an exemplary method, which may be implemented in connection with the system of FIG. 1, for imposing one or more tenant-specific filters in response to tenant queries directed to a multi-tenant data structure.

FIG. 3 illustrates exemplary method 300 for enabling tenant-specific filters in response to a data request from a particular tenant and providing results limited to data to which the particular tenant has authorized access. In the exemplary embodiments, method 300 is described with reference to the payment network 102, the issuer 108, and the multi-tenant data structure 114, and further with reference to the computing device 200. It should be appreciated, however, that the methods herein are not limited to system 100 and the computing device 200, and likewise, the systems and computing devices are not limited to method 300.

Further, the method 300 is described with reference to a user, J. Smith, who is associated with and/or employed by the acquirer 104. The acquirer 104 is a tenant of the multi-tenant data structure 114, in that at least a portion of the data included therein is associated with the acquirer 104. As such, in this exemplary description, the acquirer 104 is permitted to access that portion of the data in the multi-tenant data structure 114.

With reference to FIG. 3, in the method 300, the search engine 116 optionally (as indicated by the dotted lines) exposes, at 302, an access interface (e.g., an application programming interface (API), etc.), which is provided to receive data requests from entities, such as, for example, the acquirer 104, the issuers 106 and 108, and/or the service provider 110 (broadly, tenants). Specifically, in this exemplary embodiment, the access interface is exposed by the transport layer 118 of the search engine 116, via one or more APIs. The access interface may require a variety of information from the user and/or acquirer 104, which may include, without limitation, a description of the requested data, an identity of the user (i.e., J. Smith, with user ID 2468), an identity of the tenant (i.e., ABC Company, with tenant ID 1357) associated with the user, one or more security credentials (e.g., login credentials, etc.), etc. In some embodiments, the access interface may include a user-fillable interface, such as a graphical user interface (GUI), a command line interface (CLI), or the like, that solicits required information from the user and/or acquirer 104. Further, access interface may require authentication, which may be provided via one or more SSO mechanisms, such as, for example, OAUTH, SAML, security certificates, or the like. The user, regardless of the particular form of the access interface, ultimately submits the data request to the search engine 116.

In response, the search engine 116 receives the data request from the user and/or the tenant, at 304. The manner in which the data request is received depends, at least in part, by the type of communication between the user and/or tenant and the search engine 116. In this example, the data request is received, via a network connection (via network 112, for example) and is in the form of a HyperText Transfer Protocol (HTTP) request, or other similar protocol, etc.

In this exemplary embodiment, the data request includes a description of the data to be returned in response thereto. That description often includes limitations of the data requested. For example, the data may be limited by time, date, entities involved, etc. In one example, the data request may seek data related to all transactions on June 1 within a geographic region (e.g., as defined by a postal code, a city, a county, a state, a country, etc.), while in another example, the data request may seek data for all transactions involving one or more parties or entities (e.g., the service provider 110, etc.) in the last X months, where X may be 1, 2, 3, 4, 6, 12, etc. In one further example, the data request may be limited to a particular merchant category code (MCC), etc. The limitations described here and included in the data request are general user imposed limitations.

In addition, as suggested above, the data request further includes the user ID, the tenant ID, or both. The user ID may include a numerical code, as provided above, 2468, for example, or may be some other code and/or symbol, sequence or alpha-numeric code, which is representative of, and unique to, the user. Likewise, the tenant ID may include a numerical code, as provided above, 1357, for example, or may be some other code and/or symbol, sequence or alpha-numeric code, which is representative of, and unique to, the tenant. Further, the user ID and/or the tenant ID may be inherent in security credentials, such as, for example, login credentials.

In response to the data request, the search engine 116 identifies, at 306, the user. The identity of the user may be specific to the user, or may be general to the tenant. As such, in the former, the user would be identified as J. Smith, while in the latter, the user would be identified as the acquirer 104. Identification of the user may include, for example, extracting the user ID and/or the tenant ID from the data request. Optionally, as indicated in the dotted circle, the search engine may authenticate, at 308, the user and/or tenant, in order to identify the user. The authentication may be accomplished via authorization services, such as, for example, Java Authentication and Authorization Service (JAAS) or other similar services, etc. While the authentication, at 308, is illustrated as after the search engine 116 receives the data request, at 304, in FIG. 3, it should be appreciated that the user and/or tenant may be authenticated prior to the search engine 116 permitting a data request to be submitted, whereby, for example, the user and/or tenant may be authenticated as part of viewing the access interface exposed, by the search engine 116, at 302.

Subsequently, the search engine 116 determines, at 310, whether the data request requires filtering to enforce/enhance data security. To do so, the search engine 116 may consider factors such as, without limitation, the origin of the data request, the service and/or access interface used to deliver the data request, the user identity, a tenant identity, whether authentication was completed, etc. For instance, the search engine 116 may employ certain rules, which require user ID-based (or tenant ID-based) query filtering for all data requests received, via the transport layer 118 (e.g., via the access interface exposed at 302, etc.). Alternatively or additionally, user ID-based (or tenant ID-based) query filtering may be enabled specifically for all data requests originating from a specific tenant or non-tenant, such as, for example, a different service provider (not shown), etc. In various embodiment, filtering is enabled by a flag, whereby determining, at 210, include checking the status of the flag. In one such embodiment, the filtering flag is enabled for all requests, unless the flag to disabled for a particular reason related to a search and/or otherwise by the user. It should be understood that, in some embodiments, more, fewer, or different rules may be enforced, by the business layer 120 of the search engine 116, or otherwise, to enable query filtering for data request(s), which is based on the identified user, at 306.

If filtering is required, the search engine 116 activates, at 312, the query filter in the data layer 122, based on the identity of the user (e.g., user ID, tenant ID, etc.) (broadly, query ID filtering). Specifically, in this exemplary embodiment, because the tenant is the acquirer 104, the data query filter will cause the query to ignore data included in the multi-tenant data structure 114, but un-associated with the acquirer 104. For example, the query ID filter may be activated on an ORM object that acts as an interface between the business layer 120 and the data layer 122. When the ORM object, which is a Hibernate ORM implementation consistent with the JPA standard in this exemplary embodiment, generates a query in query language that is compatible to the data layer 122 and the data structure 114, the ORM object may insert any activated query ID filters as limitations in the query along with limitations already present, such as transaction date/time range, etc. Despite the particular reference to Hibernate ORM, it should be appreciated, however, that other mechanisms, such as with aspects and object reflections and/or manipulations, may be used in other method embodiments.

Regardless of the manner is imposed, the query ID filter may include simply a limitation that any returned result be associated with the user identity. For instance, the filter may cause a query to include "where user=<User ID>", or the like. Alternatively or additionally, the enabled query filter may further filter results based on a tenant ID associated with the user identity, a security role ID associated with the user identity, or the like. For instance, a particular user (e.g., J. Smith) at a tenant (e.g., the acquirer 104, etc.) may be authorized to access a first type of transaction data and not a second type of transaction data. In this case, a query ID filter may be enabled for a data request from the particular user (e.g., J. Smith) that filters the second type of transaction data out of the query and/or query results.

With continued reference to FIG. 3, the search engine 116 then executes the query, at 314, in the data layer 122, which hits the multi-tenant data structure 114. In this particular example, the search engine 116 directs a getData( ) request to the multi-tenant data structure 114. Consistent with the description herein, the getData( ) request includes a data security aspect, which includes one or more pointcuts. The pointcuts, when triggered, interrupt the flow of the data query to execute advice functionality, which, in this example, includes the user ID filter(s), at the data layer 122 based on the identity of the user. While pointcuts may be set to be triggered by specific conditions at method calls or executions, initializations of classes and/or objects, field reads and/or writes, thrown exceptions, etc., a pointcut, in this exemplary embodiment, when triggered during the flow of data retrieval (broadly, the data query), causes the activated query ID filter(s) to be imposed. In this manner, ORM object, which includes the one or more query ID filter(s), are enabled for the data query. After, the pointcut returns, thereby giving control back to the data query, i.e., the getData( ) request in this example, and the data query continues (in the transport layer 118) until data is retrieved from the multi-tenant data structure 114. It should be appreciated that in other embodiments, the manner in which the filter is applied to the data query, before the data flow of the query is directed to the multi-tenant data structure 114, may be otherwise.

Based on the query, which is limited by the identity of the user (at the pointcut, in the example above), only data which is defined by the data query itself (e.g., limitations of date/time, MCC, etc.) and also consistent with the identity of the user (via the query ID filter(s)) is returned from the multi-tenant data structure 114, by the getData( ) request, in this example. That is, the data query is constrained by the data query filter, activated at 312, if any.

In this exemplary embodiment, the query is executed by the data layer 122 of the search engine 116, as described above, although it should be understood that, in alternative embodiments, a query may be executed by a different entity and/or logical layer of an entity. Further, in some embodiments, a relational database contains the data structure 114, such that the executed query may be via SQL or other similar query language.

Thereafter, one or more results from the data query, as defined by at least the query ID filter(s) described above, are received from the multi-tenant data structure 114 at the search engine 116. The search engine 116 then responds, to the data request, with the results of the query, at 316.

In view of the above, the systems and methods herein provide queries, which include query ID filters, which are specific to the user submitting the request. In this manner, the query is limited to the data, which the user and/or the tenant (associated with the user) are permitted to retrieve, access and/or view. Accordingly, the data returned from the data structure is generally in a form, format and/or quality suitable to be provided to the requestor (whether tenant or otherwise) without having to further significantly process the data (e.g., rebuild pagination of the data for later discarded data based on permissions, etc.). Further, the user-specific filters, at the data layer, reduce the data retrieved, thereby reducing the memory usage, improve the utilization of existing hardware, and/or improve response times. Further still, the methods and systems herein may permit filtering, at the data layer, for example, to be utilized for different queries (i.e., without being copied to the different queries) (as a default), and called by the business layer, whereby the business layer indicates the particular identity (e.g., user and/or tenant, etc.) to be imposed thereby. As such, reproduction of security code to each of multiple queries, which may lead to revision control issues at multiple locations and/or inaccuracies if code is not edited properly, may be reduced or eliminated.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be further appreciated based on the foregoing specification, the above-described embodiments of the disclosure may be implemented using computer programming or engineering techniques including computer software, firmware, hardware or any combination or subset thereof, wherein the technical effect may be achieved by: (a) receiving a data request directed to a data structure; (b) identifying a user associated with the data request; (c) activating a data query filter based on the user identity when the data request triggers a security pointcut; (d) executing a data query on the data structure based on the data request, the data query being constrained by the data query filter; and (e) causing a data query result to be delivered in response to the data request.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for securing data of a multi-tenant data structure, the method comprising:
   exposing, by a transport layer associated with a computing device, an access interface;
   receiving, by the computing device, via the access interface, a data request from a tenant, the data request directed to a data structure, the data request including a user ID specific to a user and one or more limitations for the requested data;
   identifying, by the computing device, the user associated with the data request based on the user ID;
   directing, by the computing device, a query for data satisfying the one or more limitations to the data structure;
   when the data query triggers a security pointcut, interrupting, by the security pointcut, the data query;
   when the data query is interrupted, activating, by a business layer associated with the computing device, a data query filter based on the identified user;
   imposing, by the computing device, the activated data query filter on the data query;
   executing, by a data layer associated with the computing device, the data query on the data structure, wherein the data query is based on the one or more limitations and is constrained by the activated query data filter to data associated with the identified user; and
   causing, by the computing device, a data query result to be delivered in response to the data request.

2. The computer-implemented method of claim 1, wherein the data request is received via HyperText Transfer Protocol (HTTP); and
   wherein identifying the user includes extracting the user ID via Java Authentication and Authorization Service (JAAS).

3. The computer-implemented method of claim 1, wherein the data request further includes a tenant ID specific to the tenant; and
   wherein the method further comprises:
      identifying, by the computing device, the tenant based on the tenant ID; and
      when the data query is interrupted, activating the data query filter further based on the identified tenant, whereby the data query is further constrained to data associated with the tenant ID, such that the query is not able to return data unassociated with the tenant ID.

4. The computer-implemented method of claim 1, wherein executing, by the data layer associated with the computing device, the data query on the data structure includes executing the data query on a relational database containing the data structure.

5. The computer-implemented method of claim 4, wherein executing the data query includes executing the data query, via structured query language (SQL), on the relational database containing the data structure.

6. The method of claim 1, wherein the one or more limitations for the requested data include at least one of a time, a date, a time range, a date range, entities involved in a transaction, a geographic region, and/or a merchant category code (MCC).

7. A system for securing data of a multi-tenant data structure, the system comprising:
   a multi-tenant data structure including data associated with multiple tenants, the multi-tenant data structure including transaction data associated with a plurality of transactions, each of the multiple tenants including a banking institution; and
   a search engine coupled to the multi-tenant data structure, the search engine configured to:
      receive a data request for data included in the data structure from one of the multiple tenants, the data request including a user ID specific to a user associated with the one of the multiple tenants, a tenant ID for the one of the multiple tenants, and one or more limitations for the requested data;
      identify said user by the user ID;
      identify said one of the multiple tenants by the tenant ID;
      direct a query for data satisfying the one or more limitations to the data structure;
      interrupt the data query and activate a data query filter based on the user ID and the tenant ID;
      impose the activated data query filter on the data query;
      execute the data query to the data structure, wherein the data query is based on the one or more limitations and is further constrained, by the activated data query filter, to data associated with the user ID and the tenant ID, such that a result from the data query excludes data unassociated with said user or said one of the multiple tenants; and return the result of the data query to said one of the multiple tenants.

8. The system of claim 7, wherein the data request is received via one of HyperText Transfer Protocol (HTTP) and HyperText Transfer Protocol Secure (HTTPS), via a network connection coupled to the search engine.

9. The system of claim 7, wherein the search engine includes a business layer and a data layer including the data query filter, and
wherein the business layer is configured to activate the data query filter, in the data layer, for said user and said one of the multiple tenants based on the user ID and the tenant ID.

10. The system of claim 7, wherein the search engine is further configured to authenticate the user submitting the data request, prior to executing the data query.

11. The system of claim 7, wherein in order to identify the user, the search engine is configured to extract the user ID from the data request using Java Authentication and Authorization Service (JAAS).

12. The system of claim 7, further comprising a network interface coupled to the search engine; and
wherein the search engine includes a transport layer, which is configured to expose an access interface over the network interface and to receive a data request for data included in the data structure, via the access interface, from one of the multiple tenants.

13. A non-transitory computer readable storage media including computer executable instructions for securing data of a multi-tenant data structure that, when executed by a processor, cause the processor to:
receive a data request directed to a multi-tenant data structure, the data request including (a) a user ID specific to a user associated with one of multiple tenants and (b) one or more limitations for the requested data;
identify the user associated with the data request based on the user ID;
direct a query for data satisfying the one or more limitations to the multi-tenant data structure;
when a security pointcut is triggered, interrupt the data query and update a data query filter based on the identified user;
impose the updated data query filter on the data query;
execute the data query on the multi-tenant data structure, wherein the data query is based on the one or more limitations and is constrained, by the updated query data filter, to data associated with the identified user; and
cause a data query result to be delivered in response to the data request.

14. The non-transitory computer readable storage media of claim 13, wherein the data query filter includes limitations based on at least one of a date/time range of transactions, an entity involved in transactions, and a transaction amount range of transactions.

15. The non-transitory computer readable storage media of claim 14, wherein updating the data query filter, based on the identified user when a security pointcut is triggered, includes appending a limitation based on the identified user to the data query filter.

16. The non-transitory computer readable storage media of claim 15, wherein the data request is received via one of HyperText Transfer Protocol (HTTP) and HyperText Transfer Protocol Secure (HTTPS); and
wherein in order to identify the user, the computer executable instructions, when executed by the processor, cause the processor to extract the user ID from the data request using Java Authentication and Authorization Service (JAAS).

17. The non-transitory computer readable storage media of claim 13, wherein the computer executable instructions, when executed by the processor, further cause the processor to authenticate said user submitting the data request.

* * * * *